US011875340B2

(12) United States Patent
Sewell et al.

(10) Patent No.: US 11,875,340 B2
(45) Date of Patent: Jan. 16, 2024

(54) METHOD AND SYSTEM FOR SECURE DATA RECORD DISTRIBUTION USING A BLOCKCHAIN

(71) Applicant: nChain Licensing AG, Zug (CH)

(72) Inventors: Martin Sewell, London (GB); Daniel Joseph, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 574 days.

(21) Appl. No.: 16/603,550

(22) PCT Filed: Apr. 6, 2018

(86) PCT No.: PCT/IB2018/052406
§ 371 (c)(1),
(2) Date: Oct. 7, 2019

(87) PCT Pub. No.: WO2018/185724
PCT Pub. Date: Oct. 11, 2018

(65) Prior Publication Data
US 2021/0090072 A1    Mar. 25, 2021

(30) Foreign Application Priority Data

Apr. 7, 2017  (GB) ..................................... 1705621

(51) Int. Cl.
*G06Q 20/36*     (2012.01)
*G06Q 20/06*     (2012.01)
(Continued)

(52) U.S. Cl.
CPC ..... *G06Q 20/3678* (2013.01); *G06Q 20/0658* (2013.01); *G06Q 20/3825* (2013.01);
(Continued)

(58) Field of Classification Search
CPC .................... G06Q 20/00–425; H04L 9/00–50
See application file for complete search history.

(56) References Cited

U.S. PATENT DOCUMENTS 10,158,480 B1 * 12/2018  Winklevoss .......... H04L 9/0825
11,128,607 B2 *  9/2021  Wright .................... H04L 9/085
(Continued)

FOREIGN PATENT DOCUMENTS

GB    2464125    *  4/2008
GB    2538022    *  2/2016
(Continued)

OTHER PUBLICATIONS

Book Matter Algebra (Year: 1974).*
(Continued)

*Primary Examiner* — John W Hayes
*Assistant Examiner* — Chenyuh Kuo
(74) *Attorney, Agent, or Firm* — Davis Wright Tremaine LLP

(57) ABSTRACT

A computer-implemented method for improving the security of a data record distribution process using a blockchain having a group of input nodes and a group of output nodes, each group having a private-public key pair, but wherein the nodes only have a key share of their respective private key and no node has a full private key. Using threshold signature scheme, secret share joining, and stealth addresses, data records from the input nodes are pooled at a stealth address determined through collaborative action of the input nodes, requiring cooperative determination of their public key, a shared secret, and the stealth address. The public key is copied into the transaction. The output nodes locate the transaction and extract the public key, collaboratively verify its authenticity, and collaboratively determine the shared secret. Having done so, the output nodes may, collectively, (Continued)

sign a second transaction for distributing data records from the stealth address to the output addresses. The invention may be used in conjunction with the Bitcoin blockchain, for example, or another blockchain implementation.

14 Claims, 6 Drawing Sheets

(51) Int. Cl.
    *G06Q 20/38*     (2012.01)
    *H04L 9/06*     (2006.01)
    *H04L 9/08*     (2006.01)
    *H04L 9/30*     (2006.01)
    *H04L 9/32*     (2006.01)
    *H04L 9/00*     (2022.01)

(52) U.S. Cl.
    CPC ............ *H04L 9/0618* (2013.01); *H04L 9/085* (2013.01); *H04L 9/0825* (2013.01); *H04L 9/3026* (2013.01); *H04L 9/3265* (2013.01); *H04L 9/50* (2022.05)

(56) References Cited

U.S. PATENT DOCUMENTS

| | | | |
|---|---|---|---|
| 2010/0217986 A1* | 8/2010 | Schneider | H04L 9/3242 380/279 |
| 2013/0039491 A1* | 2/2013 | Unagami | G06F 21/575 380/44 |
| 2015/0120569 A1 | 4/2015 | Belshe et al. | |
| 2016/0321435 A1* | 11/2016 | McCoy | G06Q 20/2295 |
| 2016/0342977 A1* | 11/2016 | Lam | G06Q 20/0658 |
| 2017/0005804 A1 | 1/2017 | Zinder | |
| 2018/0295112 A1* | 10/2018 | Coppola | H04W 4/48 |
| 2018/0367316 A1* | 12/2018 | Cheng | G06F 21/602 |
| 2018/0373983 A1* | 12/2018 | Katz | G06Q 20/0655 |

FOREIGN PATENT DOCUMENTS

| | | | | |
|---|---|---|---|---|
| GB | 2538022 A | | 11/2016 | |
| KR | 20160114749 A | | 10/2016 | |
| WO | WO-2017145010 A1 * | | 8/2017 | ............ G06Q 20/36 |

OTHER PUBLICATIONS

The Evolving IP MarketPlace Aligning Patent Notice and Remedies with Competition (Year: 2011).*
Bellare et al. Introduction to Modern Cryptography (Year: 2005).*
Boneh et al. A Graduate Course in Applied Cryptography (Year: 2020).*
Direct product of groups—Wikipedia (Year: 2022).*
Elliptic-curve Diffie-Hellman—Wikipedia (Year: 2022).*
Mercer Unique Ring Signatures. Privacy on the Blockchain (Year: 2016).*
Noether Monero is Not That Mysterious (Year: 2014).*
Nigel Smart et al. IntroToCrypto (Year: 2022).*
2017_Book_ComputerSecurityESORICS2017 (Year: 2017).*
Bitcoin Q&A CoinJoin, Privacy, and Network Bifurcation (Year: 2020).*
Frankenfield Stealth Address (Cryptocurrency) Definition (Year: 2022).*
Hayes CoinJoin Definition (Year: 2021).*
CoinJoin_Bitcoin privacy for the real world (Year: 2022).*
Dash Definition (Year: 2022).*
Seth Monero (XMR) Cryptocurrency Definition (Year: 2021).*
Barker NIST Special Publication 800-56A Revised (Year: 2010).*
Guy Zyskind Efficient Secure Computation Enabled by Blockchain (Year: 2016).*
VisualCrypto (Year: 2022).*
Frankenfield ZCash Definition (Year: 2020).*

Yang et al. Survey of Confidentiality and Privacy Preserving Technologies (Year: 2016).*
Diffie New Directions in Cryptography (Year: 1976).*
Transaction Bitcoin Wiki (Year: 2020).*
16320945, Notice_of_Allowance_and_Fees_Due_(PTOL-85),dated Jun. 1, 2022 (Year: 2022).*
Courtois et al., Stealth Address and Key Management Techniques in Blockchain System, 3rd international conference on Information Systems Security and Privacy, Feb. 19, 2017-Feb. 21, 2017 (Year: 2017).*
Antonopoulos, "Mastering Bitcoin—Unlocking Digital Cryptocurrencies," O'Reilly Media, Inc., Dec. 20, 2014, 282 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.
Chaum et al., "Group Signatures," Advances in Cryptology EUROCRYPT, 1991, 9 pages.
Cheraghi, "Sharing Several Secrets Based on Lagrange's Interpolation Formula and Cipher Feedback Mode," International Journal of Nonlinear Analysis and Applications, Jan. 1, 2014, 7 pages.
Courtois et al. "Stealth Address and Key Management Techniques in Blockchain Systems," retrieved from http://www.scitepress.org/Papers/2017/62700/62700.pdf, 2017, 8 pages.
Courtois et al., "Stealth Address and Key Management Techniques," retrieved from http://www.nicolascourtois.com/bitcoin/paycoin_privacy_monero_6_ICISSP17.pdf, 2017, 53 pages.
Feedthemcake, "Auction coins moving," Reddit, retrieved from https://www.reddit.com/r/Bitcoin/comments/2ygfd7/auction_coins_moving/, Mar. 9, 2015, 23 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Goldfeder et al., "Escrow Protocols for Cryptocurrencies: How to Buy Physical Goods using Bitcoin," retrieved from http://fc17.ifca.ai/preproceedings/paper_122.pdf, 2017, 18 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Ibrahim et al., "A robust threshold elliptic curve digital signature providing a new verifiable secret sharing scheme," 2003 IEEE 46th Midwest Symposium on Circuits and Systems 1:276-280, Dec. 30, 2003, 6 pages.
Ibrahim, "SecureCoin: A Robust Secure and Efficient Protocol for Anonymous Bitcoin Ecosystem," International Journal of Network Security 19(2):295-312, Mar. 2017, http://ijns.jalaxy.com.tw/contents/ijns-v19-n2/ijns-2017-v19-n2-p295-312.pdf.
International Search Report and Written Opinion for Application No. PCT/IB2018/052406, dated Jun. 15, 2018, filed Apr. 6, 2018, 10 pages.
Rivest et al., "How to Leak a Secret," ASIACRYPT, 2001, 14 pages.
Ruffing et al., "CoinShuffle: Practical Decentralized Coin Mixing for Bitcoin," European Symposium on Research in Computer Security, Sep. 7, 2014, Sep. 7, 2014 (revised Aug. 14, 2014), 21 pages.
Rush, "Stealth Threshold Multi-Signature: New Kid on the Block," retrieved from https://yurirush.me/2015/03/10/stealth-threshold-multi-signatures-new-kid-on-the-block/, Mar. 10, 2015, 3 pages.
UK Commercial Search Report dated May 19, 2017, Patent Application No. GB1705621.9, 6 pages.
UK IPO Search Report dated Sep. 22, 2017, Patent Application No. GB1705621.9, 6 pages.
Ziegeldorf et al., "CoinParty: Secure Multi-Party Mixing of Bitcoins," Proceedings of the 5th ACM Conference on Data and Application Security and Privacy, Mar. 2, 2015, 12 pages.
Ziegeldorf et al., "Secure and Anonymous Decentralized Bitcoin Mixing," retrieved from https://www.martinhenze.de/wp-content/papercite-data/pdf/zmh+16.pdf, 2016, 28 pages.

(56) References Cited

OTHER PUBLICATIONS

Yang, et al., "Survey of Confidentiality and Privacy Preserving Technologies for Bloackhains", Nov. 14, 2016, 32 pages.

\* cited by examiner

METHOD AND SYSTEM FOR SECURE DATA RECORD DISTRIBUTION USING A BLOCKCHAIN

FIELD OF INVENTION

This invention relates generally to blockchain transactions and more particularly to methods and devices to generate and carry out a data record distribution process that decouples inputs from outputs to improve security.

BACKGROUND OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

Accordingly, the present application may refer to a "data record" being recorded with respect to a blockchain. The data record may include, for example, a document, a measure of processing power or time, a cryptocurrency quantity, a security or other token indicative of ownership of an asset, or other such things that may be controlled by an entity in possession of the cryptographic material that allows that entity to use or move that data record.

One of the perceived advantages of blockchain technology, such as Bitcoin, is its anonymity and security. That is, the Bitcoin ledger does not contain any personal information about those participating in transactions; it only contains public address information. However, using external data and analytics it is possible to successfully associate specific transactions and addresses with an individual.

In order to improve anonymity and fungibility of a cryptocurrency, like Bitcoin, coin mixing transactions may be used. A coin mixing transaction, like CoinJoin, pools a set of inputs and transfers value to a set of outputs. However, CoinJoin still involves at least one participant that has knowledge of the input-output relationship of another participant, making it only partly anonymous, thereby resulting in a less secure transaction and deficient cryptographic solution.

The potential traceability of records in the blockchain reveals an implementation flaw that may prejudice certain applications. Example applications include submitting exams or papers for marking, submitting anonymous crime reports, submitting anonymous survey or census returns, or other such applications in which groups of participant nodes need to securely and confidentially transfer a data record to one or more other nodes under circumstances where the data is unalterable after the submission.

SUMMARY OF INVENTION

Thus, it is desirable to provide for improved methods and devices that provide for heightened security and more robust cryptography through improved untraceability and unlinkability of inputs to outputs, while still producing an efficient and compact data record distribution process.

Such an improved solution has now been devised.

Thus, in accordance with the present invention there are provided methods and devices as defined in the appended claims.

The invention may provide a computer-implemented method and corresponding system. The method/system may be described as a blockchain-implemented method/system. The invention may be described as a security method or cryptographic method/system. It may provide for the secure transfer of a digital asset or data record, such as a portion or quantity of cryptocurrency. Additionally or alternatively, it may provide a control mechanism for controlling the transfer of a digital asset such as a portion or quantity of cryptocurrency.

Through the use of a collaboratively-determined stealth address at which data records are pooled, and the requirement of collaborative and cooperative output node participation in distributing data records from the pooled stealth address to designated output addresses, the data distribution process may be made more secure and robust.

Additionally or alternatively, the present application may describe a computer-implemented method to participate in a data record distribution process using a blockchain, the data record distribution including multiple input addresses and multiple output addresses, each address being controlled (or owned) by a respective input node or output node. The method, implemented at one of the input nodes, includes obtaining a first public key associated with the output nodes; obtaining a key share of a second private key associated with the input nodes, the second private key is unknown to any of the input nodes; collaborating in deriving a second public key corresponding to the second private key using secret share joining; collaborating in deriving a shared secret using the first public key, the key share, and secret share joining; and generating a first blockchain transaction that receives data records from the multiple input addresses and that has a stealth address as an output address, wherein the stealth address is based on the first public key and the shared secret.

In some implementations, the first blockchain transaction includes a non-transactional code and copy of the second public key. In some cases, the non-transactional code is OP_RETURN or functional equivalent, and the copy of the second public key follows the OP_RETURN in the first blockchain transaction.

In some implementations, collaborating in deriving the second public key includes calculating a term of a first Lagrange polynomial interpolation that includes the key share, and summing the term with terms of the first Lagrange polynomial provided by other input nodes.

In some implementations, generating the first blockchain transaction includes determining the stealth address as the sum of the first public key and a secret public key having the shared secret as a corresponding private key.

The present application further describes a computer-implemented method to participate in a data record distribution process using a blockchain, the data record distribution process including multiple input addresses and multiple output addresses, each address being controlled (or owned) by a respective input node or output node. The method, implemented at one of the output nodes, includes obtaining a key share of a first private key associated with the output nodes, the first private key being unknown to any of the output nodes, the first private key being associated with a first public key; searching a blockchain for a first blockchain transaction containing a second public key associated with the input nodes, the first blockchain transaction identifying the multiple input addresses and having a stealth address as an output address; collaborating in deriving a shared secret using the second public key extracted from the first transaction, the key share, and secret share joining; determining the stealth address using the first public key and the shared secret and comparing the determined stealth address to the output address of the first blockchain transaction to confirm they match; and collaborating in signing a second blockchain transaction to distribute data records pooled in association with the stealth address to the multiple output addresses, wherein signing includes employing an elliptic curve digital signature algorithm using the shared secret and the key share.

In some implementations, searching the blockchain includes identifying transactions containing a non-transactional code. In some cases, the non-transactional code is a command or instruction which can be used to mark a blockchain transaction as invalid. This may be, for example, the OP_RETURN op_code as known in the Bitcoin protocol, or a functionally equivalent command associated with a different blockchain protocol. The second public key may follow (i.e. be placed after) the OP_RETURN in the first blockchain transaction.

In some implementations, the method further may involve collaborating in deriving the first public key corresponding to the first private key using secret share joining. In some cases, collaborating in deriving the first public key may include calculating a term of a first Lagrange polynomial interpolation that includes the key share, and summing the term with terms of the first Lagrange polynomial provided by other output nodes.

In some implementations, collaborating in deriving the shared secret may include calculating a term of a second Lagrange polynomial interpolation that includes the key share and the second public key, and summing the term with terms of the second Lagrange polynomial from other output nodes.

In some implementations, determining the stealth address may include determining the stealth address as the sum of the first public key and a secret public key having the shared secret as a corresponding private key.

In some implementations, employing an elliptic curve digital signature algorithm may include using secure inverse and secure multiplication in a threshold signature scheme, wherein a private key corresponding to the stealth address is collaboratively determined as the first private key plus the shared secret.

In some implementations, data record distribution may referred to as value mixing.

The present application further describes computing devices for performing the described methods, where the computing devices include at least one processor, memory, a network interface, and a blockchain application containing processor-executable instructions that, when executed, cause the processor to carry out the describe operations of one or more of the methods described herein.

The present application further describes non-transitory processor-readable medium storing processor-executable instructions to participate in a data record distribution using a blockchain among a plurality of participating nodes, wherein the processor-executable instructions, when executed by a processor in one of the participating nodes, cause the processor to carry out the operations of one or more of the methods described herein.

BRIEF SUMMARY OF THE DRAWINGS

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompanying drawings, in which.

DETAILED DESCRIPTION

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
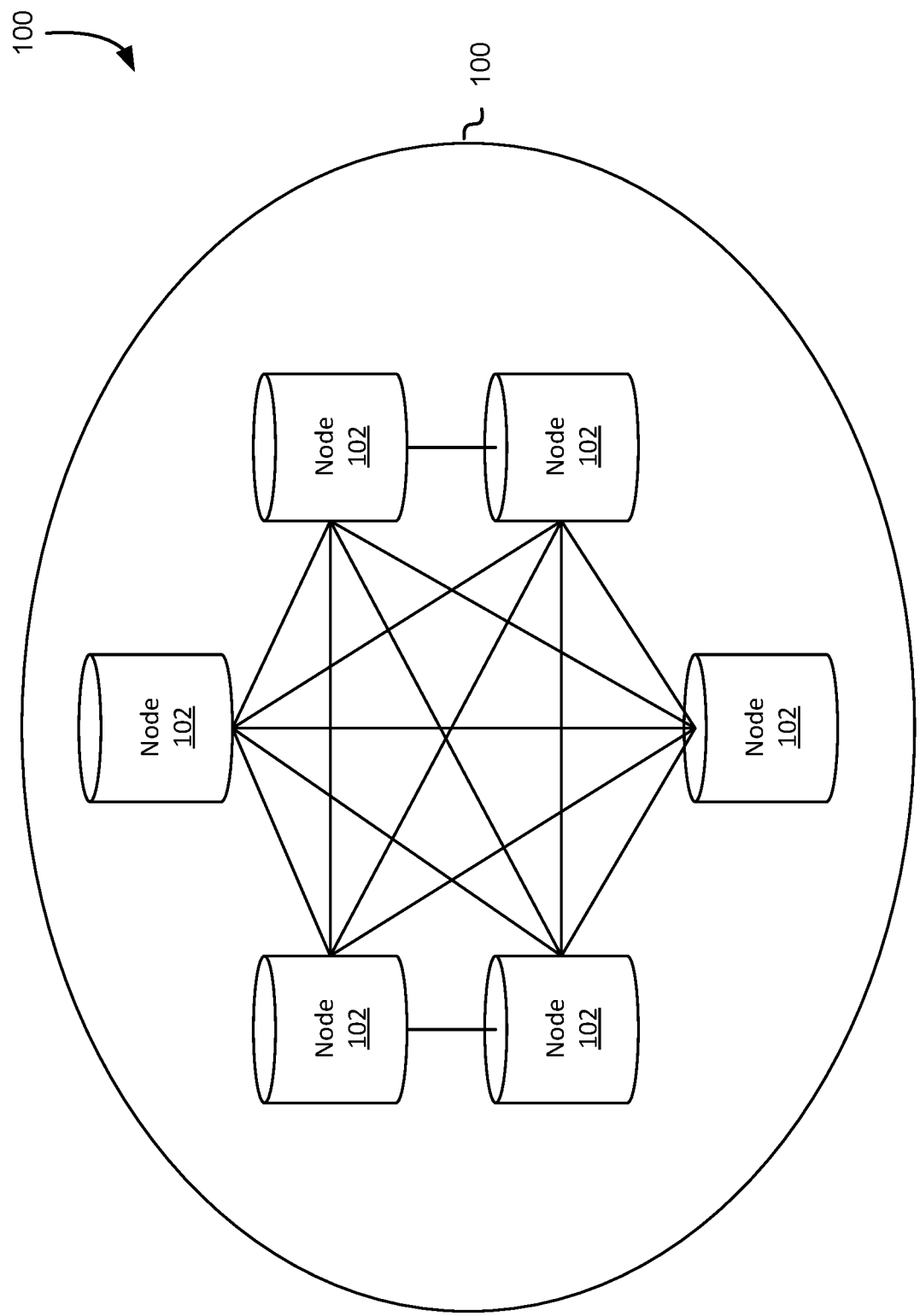
FIG. 1 illustrates an example blockchain network of nodes.

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output. A subsequent transaction may then reference that address as an input in order to spend or disperse that value.

While the transactions are pseudo-anonymous in that no personal information in contained in the transactions on the blockchain ledger, it is possible to trace the transfer of value in chains of transactions and, in some cases, to link value to an individual using external data. In order to increase anonymity, a coin mixing transaction may be used to pool inputs from a variety of sources and then to divide and allocate the pooled value to outputs. If all the inputs and outputs are the same size, it is difficult to associate a particular input with a particular output. However, in such transactions at least one participating node is aware of the linkage between an input address and output address specified by another participating node. In such coin mixing transactions, such as a CoinJoin operation in the Bitcoin protocol, a single transaction having multiple inputs and multiple outputs is used to mix the values.

Some other anonymizing techniques are used to try to avoid revealing links between an input and an output, such as ring signatures or stealth addresses, with varied effectiveness. Stealth addresses try to de-link the output address to which funds are sent from a particular user. Ring signatures try to make a source untraceable by making it equiprobable that any one of a group of possible signatories was the one that signed/authorized a particular transaction. Unfortunately, ring signatures have proven to be problematic to implement in some protocols, such as Bitcoin, since the structure of a signature compatible with the ring signature concept is incompatible with the signature requirements of Bitcoin. Some other cryptocurrencies, such as Monero, are specifically designed to enable ring signatures.

As noted above, in a number of applications (in addition to mixing cryptocurrency values) it would be advantageous to provide for a secure immutable document or data record distribution system in which input nodes supply documents to output nodes in a manner that prevents linking of the input node with a particular document at a particular output node. Such applications include submission of exams or papers, submission of crime reports, or submission of survey or census responses, among many others.

In accordance with the present application a method and device are described that facilitate data record distribution in a manner that effectively delinks the inputs from any particular signatory and effectively delinks the outputs from any particular recipient, thereby providing untraceability and unlinkability. Doing so within the structure of a blockchain protocol presents significant technical implementation challenges in providing for that security and ensuring efficient and effective completion of the distribution without partial failure or partial distribution. The following description provides at least one, illustrative embodiment of a solution to those technical implementation challenges.

In the description herein, the terms "input node," "output node," "participating node," "input address," and "output address" may be used. The reference to an "address" of a node is not meant to refer to a network address of a physical node. Instead the "address" is an address specified in a transaction on the blockchain having an unspent value to which the physical node can claim ownership by having or controlling a key that corresponds to a signature on the transaction. In this sense, the "output address" is not an address of the participating node, but is a blockchain transaction output address that is owned by or associated with the participating output node. Likewise, the "input address" is an address of an unspent transaction output (UXTO) that is owned by or associated with the participating input node.

Elliptic Curve Digital Signatures

Some blockchain technologies, like Bitcoin, use Elliptic Curve Digital Signature Algorithm (ECDSA) as the mathematical scheme for digital signing. ECDSA is a cryptographic digital signature used to ensure that value associated with an UXTO can only be spent by its rightful owner. Parameters required for ECDSA signatures include:

E—elliptic curve function
G—a base point on the elliptic curve with order n: $n \times G = 0$
n—a large prime number
q—subgroup order The key pair is generated from a random number x, where $0 < x < n$. The number x serves as the private key and the public key P is generated as $P = x \times G$.

Given a message m, random number k and private key x, a signature is produced with the pair (r, s). The random number k is selected such that $0<k<q$. Then $r=k \times G$ is calculated and $s=k^{-1}(m+xr)$ mod n is calculated, where $k^{-1}$ is the multiplicative inverse of k mod n: $k^{-1}k \equiv 1$ mod n. This gives the signature (r, s). Given signature (r, s), message m and public key P, the signature may be verified. To verify the signature, $v=s^{-1}m \times G+s^{-1}$ $r \times y$ is calculated. In this expression, $s^{-1}$ is the multiplicative inverse of s mod a such that $s^{-1}s \equiv 1$ mod n. The signature is valid if v=r. Remember that G has order n, therefore the mod n part of $s^{-1}$ goes away when EC point is multiplied with G.

Threshold Signature Scheme

A technique called "threshold signature sharing" has been developed to enable splitting a secret key into shares and distributing those shares among a set of participants. In this technique any subset of the set of participants may reconstruct the secret so long as the cardinality of the subset is greater than or equal to a specified value t. If the cardinality of the subset is less than t then no information about the secret is revealed. This means that at least t participants must collaborate to sign using the shared secret. The distribution of key shares among participants may be done using a central dealer who assigns key shares, or through a dealerless system of distribution. Each solution has its advantages and disadvantages requiring careful consideration of the requirements of the system being implemented when choosing between distribution methods.

In at least one embodiment, the technique may involve embedding the secret in a polynomial of degree t. Each of the n participants is assigned a point on the then-unknown polynomial, resulting in the ability of t+1 participants to accurately reconstruct the polynomial using Lagrange Polynomial Interpolation.

A variation has been developed called Threshold Signature Scheme whereby m of n participants in possession of individual key shares can cooperate to execute a cryptographic-based computation without the secret key being reconstructed/revealed to any of the individual participants, and involving 2t+1 participants to generate the signature.

The threshold signature scheme relies extensively on Lagrange Polynomial Interpolation. Lagrange Polynomial Interpolation tells us that a function $f(x)$ with degree t can be reconstructed with t+1 points $p=\{(x_1, f(x_1)), (x_2, f(x_2)), \ldots, (x_{t+1}, f(x_{t+1}))\}$ $$f(x) = \sum_{i \in p} f(x_i) \prod_{j \in p, j \neq i} \frac{x - x_j}{x_i - x_j} = \sum_{i \in p} f(x_i) b_{i,p}(x)$$

Where the Langrage coefficient $$b_{i,p}(x) = \Pi_{j \in p, j \neq i} \frac{x - x_j}{x_i - x_j}$$

Note that: $b_{i,p}(x_i)=1$, and $b_{i,p}(x_j)=0$

One element of the threshold signature calculations is the determination of $x \times G$ where x is the secret key and G is a point on the Elliptical Curve. Given a secret key x where its key shares are 'split' among n participants:

Arbitrary secret x is the point $f(0)$ on polynomial $f(x)$
Shares (of key x) $x_1, x_2, \ldots, x_n$ correspond to $f(x_1), f(x_2), \ldots, f(x_n)$
If $f(x)$ is a t-degree polynomial, secret x can be interpolated by $x=\Sigma_{i \in \pi} b_{i,\pi} x_i$ where $\pi$ is a size t+1 subset of shares $x_a, x_b, \ldots, x_t, x_{t+1}$ and b is a Langrage coefficient, as mentioned above in connection with Lagrange Polynomial Interpolation.

$\pi$ is a group of t+1 participants collaborating to calculate $x \times G$ without revealing their individual $x_i$ shares. x is the x=0 point on a t-degree polynomial Each participant i calculates a part $b_{i,\pi} x_i \times G$ All participants in $\pi$ add their part together (reconstructing the secret x via Lagrange interpolation) giving:

$$b_{a,\pi} x_a \times G + b_{b,\pi} x_b \times G + \ldots + b_{t+1,\pi} x_{t+1} \times G = x \times G$$

This process may be referred to as "Secret Share Joining."

Another aspect of producing threshold signatures is the ability to multiply two secret keys producing xy mod n. Where two t-degree polynomials are being multiplied, the outcome is a polynomial of degree 2t. As a consequence, 2t+1 participants must collaborate to output the product without revealing their shares. In this example, $\pi$ is therefore a group of 2t+1 participants.

Each participant already has a share $x_i$ and share $y_i$. Note that because x and y are the x=0 point on a t-degree polynomial, xy is the x=0 point on a 2t-degree polynomial which requires 2t+1 points to interpolate. Note that in the interpolation to determine xy, the shares $x_i$ are replaced by $x_i y_i$ and for the Langrage coefficient $b_{i,p}(x)$, the set p now contains 2t+1 members.

Each participant i calculates a part $b_{i,\pi} x_i y_i$ mod n

All participants in $\pi$ add their part together giving:

$$((b\alpha,\pi x_a y_a \text{ mod } n)+(b_{b,\pi} x_b y_b \text{ mod } n)+ \ldots + (b_{2t+1,\pi} x_{2t+1} y_{2t+1} \text{ mod } n)) \text{mod } n = xy \text{ mod } n$$

This process may be referred to as "Secure Multiplication."

Producing an ECDSA signature collaboratively involves the collaborative determination of the multiplicative inverse $k^{-1}$ of k mod n such that $k^{-1}k \equiv 1$ mod n. Recall that, given a message m, random number k and private key x, an ECDSA signature is of the pair (r, s) where k is such that $0<k<q$ and q is the order of the subgroup. Note that $r = k \times G$ $s = k^{-1}(m+xr) \text{mod } n$ The group $\pi$ is comprised of 2t+1 players collaborating to calculate a share in $k^{-1}$ mod n without revealing their share $k_i$ and without having to reconstruct k. In one illustrative example embodiment, the collaborative generation of the multiplicative inverse may include the following steps:

The group uses dealerless secret distribution to calculate a share $c_i$ which is a random number.

Each participant i calculates a part $b_{i,\pi} k_i c_i$ mod n

All participants in $\pi$ add their part together giving:

$$((b_{a,\pi} k_a c_a \text{ mod } n)+(b_{b,\pi} k_b c_b \text{ mod } n)+ \ldots + (b_{2t+1,\pi} k_{2t+1} c_{2t+1} \text{ mod } n)) \text{mod } n = kc \text{ mod } n$$

All participants calculate the multiplicative inverse $(kc \text{ mod } n)^{-1} \text{ mod } n = k^{-1} c^{-1} \text{ mod } n$ Each participant i calculates a second part $k^{-1} c^{-1} \times c_i$ mod n. This is their share in $k^{-1}$ $\pi'$ is a group of t+1 players given that the polynomial for share in $k^{-1}$ is only of t-degree.

c is a secret on a t-degree polynomial and requires t+1 shares to reconstruct—and, as is now shown—computing $k^{-1}$ mod n only requires reconstructing c.

$$(k^{-1} c^{-1} \times b_{a,\pi} c_a \text{ mod } n)+(k^{-1} c^{-1} \times b_{b,\pi} c_b \text{ mod } n)+ \ldots +(k^{-1} c^{-1} \times b_{t+1,\pi} c_{t+1} \text{ mod } n)) \text{mod } n = k^{-1} c^{-1} \times c \text{ mod } n = k^{-1} \text{ mod } n$$

Note that the secret c is never revealed.

This process may be referred to as "Secure Inverse."

The "Secure Multiplication" and "Secure Inverse" processes may be applied to collectively and collaboratively generate an ECDSA signature without reconstructing the private key. In this process, $\pi$ is a group of 2t+1 participants. Each participant has a share $x_i$ of private key x. Note that the following processes involves the use of a second secret k, but the need for the second secret k could be eliminated in some implementations as long as the secret x is not reused. For instance, in a cryptocurrency setting, so long as the threshold signature authorises the transfer of the entire balance of the account to a fresh address. In one example, k could be set to the hash of the message m. This simplifies the secure ECDSA procedure and clarifies the situation with regard to the threshold for signing (it is 2t+1). However, in this illustrative example, a second secret k is used:

- The group $\pi$ uses dealerless secret distribution to calculate, for each participant, a share $k_i$. The group $\pi$ has at least 2t+1 participants.
- A subgroup $\pi'$ of t participants collaborate to produce $r=k \times G$ using Secret Share Joining. This value is broadcast to the whole group.
- The group uses Secure Inverse to calculate a share in $k^{-1}$ mod n. This share is referred to herein as $k_i^{-1}$
- Each participant i calculates a part $b_{i,\pi} k_i^{-1}(m+x_i r)$ mod n, where m is the message (the transaction) being signed.
- The group collaborates to add their respective part giving:

$$\left((b_{a,\pi} k_a^{-1}(m+x_a r) \bmod n) + (b_{b,\pi} k_b^{-1}(m+x_b r) \bmod n) + \ldots + (b_{2t+1,\pi} k_{2t+1}^{-1}(m+x_{2t+1} r) \bmod n)\right) \bmod n = k^{-1}(m+xr) \bmod n$$

- This amounts to secure multiplication of $k^{-1}$ with m+xr (where x is the secret) which requires 2t+1 shares.
- The group has successfully calculated the signature without revealing the private key and without individual members revealing their respective private key shares:

$r=k \times G$ $s=k^{-1}(m+xr)$ mod n

Stealth Address Group Threshold Exchange

As mentioned above, the present application proposes methods and devices for secure data record distribution from a set of inputs to a set of outputs. In other words, a first group of participants, Group A, each supply an input data record and a second group of participants, Group B, each receive an output data record. The methods and devices operate so as to make it difficult for an external party to identify which input address transferred which data record to which output address. It may be assumed that no member of Group A is also a member of Group B.

In particular, the present application proposes a process in which the Group A participants use a first transaction to transfer data records to a stealth address, and Group B uses a second transaction to transfer data records from the stealth address to the output addresses. A stealth address is one collectively controlled by Group B at which the input data records will be pooled. In the described process, the private keys used by the two groups are never actually known by any individual member of the respective groups and the process is carried out on a collaborative basis. The example embodiment described herein emulates untraceability and unlinkability characteristics of some altcoin protocols, but does so within the technical constraints imposed by some ECDSA-based blockchain protocols, like, for example, Bitcoin.

Figure 2:
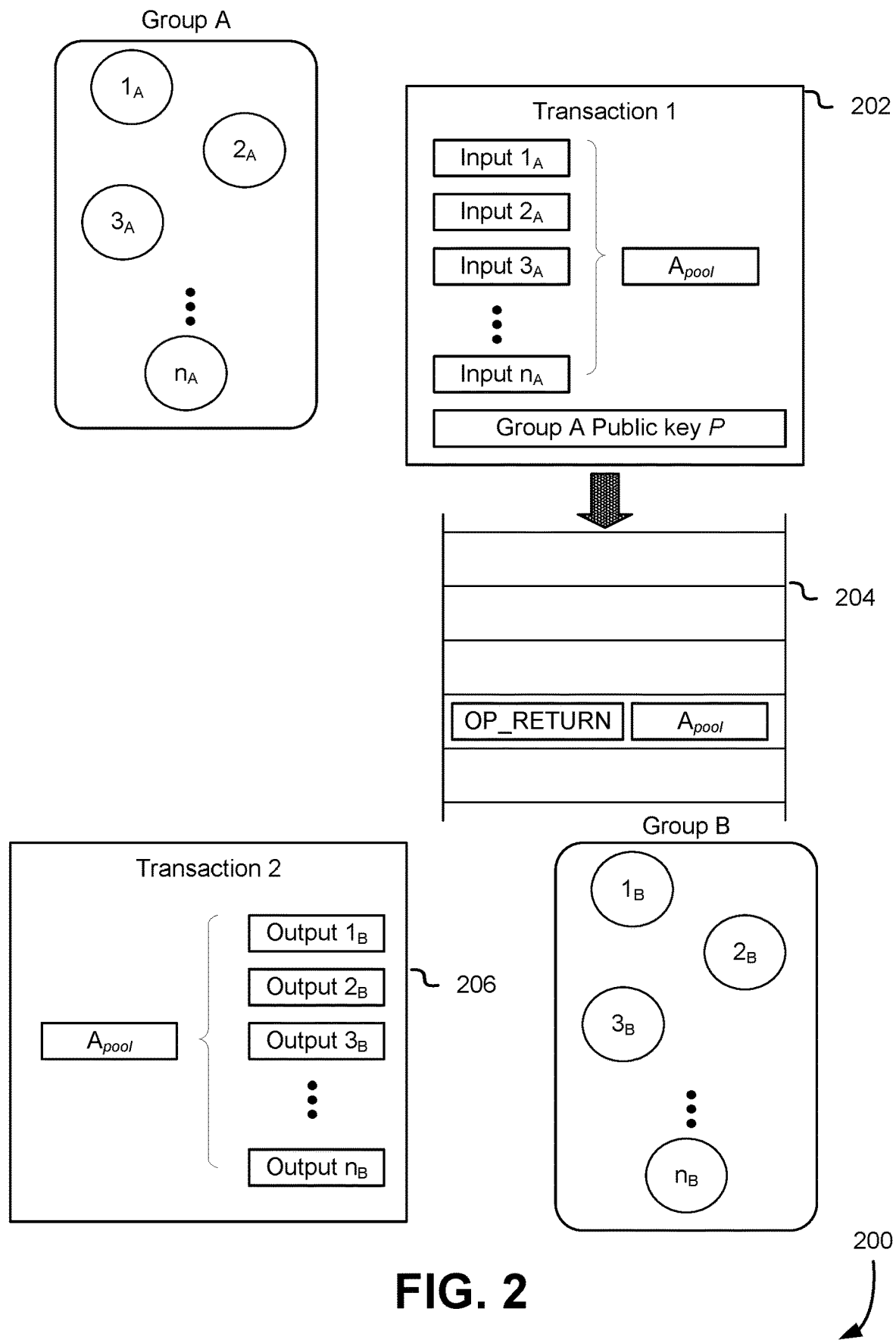
FIG. 2 diagrammatically illustrates one embodiment of a data record distribution process.

Reference is now made to FIG. 2, which diagrammatically illustrates one embodiment of the data record distribution process 200. A plurality of nodes are members of a Group A set of nodes. The nodes are indicated as nodes $1_A$, $2_A$, $3_A$, ..., $n_A$, for a total of $n_A$ nodes. The "nodes" may be referred to herein as members or participants or participating nodes. In some implementations, each node is a wallet or other such blockchain entity. Another plurality of nodes are members of a Group B set of nodes, indicated as $1_B$, $2_B$, $3_B$, ..., $n_B$, for a total of $n_B$ nodes. In most implementations, it may be assumed that $n_A=n_B$. In some implementations, no member of Group A is also a member of Group B. However, in some cases, at least one node in Group A is also a node in Group B; such as where a wallet or other such node places a data record in a data record distribution transaction and owns a corresponding, but delinked, output address where the same data record will appear following the transaction. In some implementations, the data records are quantities of cryptocurrency.

Figure 3:
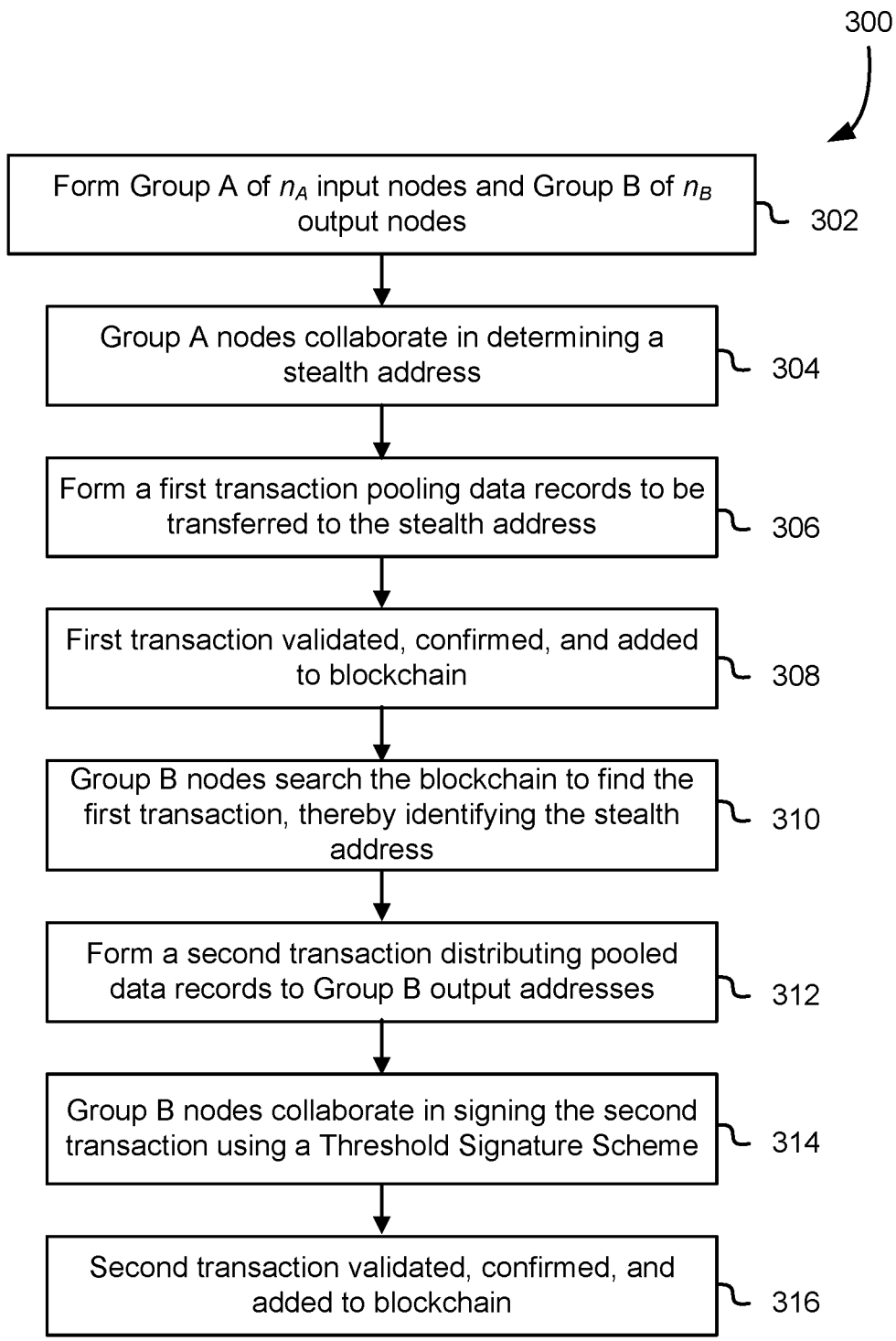
FIG. 3 shows, in flowchart form, an example process for data record distribution in a blockchain transaction.

Reference is now also made to FIG. 3 in conjunction with FIG. 2. FIG. 3 shows, in flowchart form, an example process 300 for data record distribution in a blockchain transaction. As indicated in operation 302, Group A and Group B are formed. Nodes may join an advertised or published data record distribution transaction opportunity in a dealerless manner. As will be described later below, dealerless distribution of key shares may occur. It is also possible that some implementations may involve a more centralized transaction joining and key share distribution architecture.

The nodes of Group A each have their own public-private key pairs to enable them to sign their respective inputs and prove ownership of their respective UTXOs. They also collectively share a public-private key pair, P|e, although each node only has a respective share e, of the private key e and no node knows the actual private key e. Similarly, the Group B nodes collectively have a public-private key pair, Q|d, although each node only has a respective share $d_i$ of the private key d and no node knows the actual private key d. The Group B public key Q is shared with the Group A nodes.

Using the Group A private key shares $\{e_i\}$ and Secret Share Joining, at least $m_A$ of the $n_A$ nodes collaboratively determine a stealth address, $A_{pool}$, as indicated by operation 304. The stealth address is based partly on the Group B public key Q and at least $m_A$ shares of the Group A private key. It is not known to Group B and is not "owned" in the sense that any particular node controls the stealth address by owning its corresponding private key.

In operation 306, the nodes of Group A form a first transaction 202, with each node contributing an input data record. The input data record is contributed by way of specifying a data record owned or controlled by the respective node. In one example involving cryptocurrency, the data record is a UTXO controlled by the respective node. In many implementations, to improve anonymity in the data record distribution operation the input data records are indistinguishable on their face. For example, in the case of cryptocurrencies, the input data records may be the same quantity of cryptocurrency. The output of the first transaction 202 is the collection of output data records pooled at the stealth address $A_{pool}$.

Also included in the first transaction 202 is a copy of the Group A public key P. This value may be placed in a data field of some type that will not negatively impact the transaction. The data field may be a designated field for comments, text, or any such data not relevant to the transaction. In some cases, the data field may be marked or specified by a specific code or signal to indicate that the field contains non-transactional data. In the Bitcoin protocol, for example, the OP_RETURN code is a script opcode used to mark invalid transaction output. Because any data placed after the OP_RETURN code is ignored in processing Bitcoin payments, it can effectively work as a message or data storage field within a transaction. Accordingly, in one implementation based on the Bitcoin protocol, the first transaction 202 includes an output with an OP_RETURN code followed by the Group A public key P. In generic terms, the code that indicates that non-transactional data or information is included in the transaction may be referred to herein as a "non-transactional code."

The Group A members then sign their respective inputs and the first transaction 202 is submitted to the blockchain network for validation and confirmation, as indicated by operation 308. The first transaction 202 is eventually incorporated into a block and added to the blockchain 204.

In operation 310, the Group B nodes, or a subset of them, search the blockchain to identify transactions that contain an OP_RETURN code (or similar data field or code, depending on the blockchain protocol being used). It will be noted that the Group B nodes do not know the Group A public key P and do not know the stealth address $A_{pool}$ at which value has been pooled. With each transaction found to contain an OP_RETURN code, the Group B nodes assess whether it corresponds to the data record distribution transaction for which they are searching. They do this by testing the value that follows the OP_RETURN code in a mathematical operation that further involves their own private key shares using Secret Share Joining, to generate a shared secret that was used by the Group A nodes in generating the $A_{pool}$ stealth address. If the mathematical operation, an example of which is described below, confirms the stealth address that matches the output address in the transaction, then the Group B nodes have determined that the transaction is the first transaction 202. Note that the confirmation of the stealth address relies on collaboration of the Group B nodes in a Secret Share Joining procedure using the private key shares $\{d_i\}$ as part of the assessment, and that none of the Group B nodes knows the Group B private key d.

Once the Group B nodes have collectively managed to identify the first transaction 202, they then are also capable of collaboratively generating the private key for the address $A_{pool}$, although none of the Group B nodes is able to independently generate that private key, since it is partly based on the Group B private key d.

The Group B nodes then, in operation 312, join a second transaction 206 in which the input is the stealth address $A_{pool}$, and the outputs are the respective output addresses specified by the members of Group B. In some cases, one or more of the outputs may be specified by one or more members of Group A as a part of the agreement underlying the data record distribution process, and may be, in some examples, specified to respective Group B members in a separate secure communication. The second transaction 206 is signed by the Group B members using the Threshold Signature Scheme in operation 314, wherein the private key associated with the input stealth address is based partly on the shared Group B private key d. As described above, at least $2t_B+1$ of the Group B nodes collaborate in signing the second transaction 206, where $t_B$ is the order of the secret polynomial involved in the Lagrange Polynomial Interpolation.

Once the second transaction 206 is signed, it is submitted to the blockchain network for validation and confirmation in operation 316. The pooled data records are distributed to the respective output addresses.

A more detailed implementation example of the data record distribution process is provided below. This example is based on use of the Bitcoin protocol in which ECDSA is the signing mechanism. In the example below, G is the generator of the elliptic curve. The respective groups, GroupA and GroupB are formed and have their respective key shares distributed among the participating nodes. The first stage of the process involves pooling data records at the stealth address and Group B members manage to identify the transaction and derive (collaboratively) the private key for the stealth address:

The receiving group GroupB, creates a public key $Q=d\times G$ where d is a secret key unknown to individual members of the group. However each of the $n_B$ members of GroupB has a key share $d_i$ of the secret key d, and thus $m_B$ members of GroupB must collaborate to calculate Q. This is calculated using Secret Share Joining. The resultant public key Q is made available to any interested party and, in particular, GroupA.

The sending group GroupA, also generates a public key $P=e\times G$ using Secret Share Joining among $m_A$ of $n_A$ members of the group, where each member of the group has a key share $e_i$.

The shared secret between both groups will be $c=H(e\times Q)=H(d\times P)$ where H is a cryptographic hash function. GroupA determines $e\times Q$ using Secret Share Joining among $m_A$ of $n_A$ members of the group then ultimately calculates $c=H(e\times Q)$.

Note that at this point in time the recipient group GroupB is unaware of, and cannot determine, the secret value c, as the GroupA public key value P has not yet been communicated to the group.

Members of GroupA create a first transaction sending their individual data records to a stealth address $A_{pool}$ derived from the expression $Q+(c\times G)$. In other words, the stealth address is based on the shared secret c and on the GroupB public key Q. In this example derivation of the stealth address, the address is based on the addition of the public key Q and a secret public key given by $(c\times G)$, wherein the shared secret c is the private key corresponding to the secret public key.

Also included in the transaction is an OP_RETURN output where the value P is placed.

The recipient group GroupB searches the blockchain for transactions with an OP_RETURN code.

GroupB assumes that the data included in each of the OP_RETURN outputs of these transactions is P, and uses that value to calculate $c=H(d\times P)$, the shared secret. This calculation is yet another collaborative Secret Share Joining procedure using the key shares $\{d_i\}$ of $m_B$ participants in the calculation of $d\times P$. If the value is actually P, then the proper shared secret c will be generated and GroupB can test that by assessing whether the output is the stealth address given by $Q+(c\times G)$.

If the stealth address is confirmed (i.e. the proper shared secret c has been determined) then the private key for that address, $A_{Pool}$, is d+c. Note that $Q=d\times G$ and therefore $Q+(c\times G)=(d\times G)+(c\times G)=(d+c)\times G$.

After this first stage, the recipient GroupB nodes now have the ability to distribute the data records at the address $Q+(c\times G)$ to their ultimate output addresses, however this must also be done collaboratively as individual members of the group have no knowledge of the secret key d and would be unable to sign the transaction.

In the second stage of the transaction, at least $2t_B+1$ participants of GroupB must then collaborate to sign the transaction for data records stored at the stealth address, $Q+(c \times G)$, where $t_B$ is the order of the secret polynomial.

In this example, the private key of the address that needs to be signed is d+c where c is the shared secret value across GroupA and GroupB and d is such that $Q=d \times G$. Recall from the above discussion of ECDSA signatures (r, s) that:

$$r = k \times G$$

$$s = k^{-1}(m+xr) \bmod n$$

where k is a random number such that $0<k<q$ and q is the subgroup order.
Therefore $$s = k^{-1}(m+(d+c)r) \bmod n$$

$$s = k^{-1}(m+dr+cr) \bmod n$$

The GroupB nodes collaborate using Secure Inverse and Secure Multiplication in the process of creating and adding the parts of the individual group members giving:

$$\left((b_{a,\pi}k_a^{-1}(m+d_a r+cr)\bmod n\right) + \left(b_{b,\pi}k_b^{-1}(m+d_b+cr)\bmod n\right) + \ldots + \left(b_{2t+1,\pi}k_{2t+1}^{-1}(m+d_{2t+1}r+cr)\bmod n\right)\bmod n = k^{-1}(m+dr+cr)\bmod n$$

Having collaboratively generated the signatures in this manner, the transaction distributing the pooled data records is signed and submitted to the blockchain.

It will be appreciated that the foregoing examples omit some implementation details of the system that would be understood by a person skilled in the art; as examples, the handling of potential 'change' in a cryptocurrency transaction, or transaction fees that may be required for use of the blockchain.

It will also be appreciated that the distribution of key shares may be done in a dealerless way or via a central authority. In any such implementation, stakeholders may assess the disadvantages and advantages of each approach and decide upon which method best satisfies or balances security, reliability, and efficiency needs.

Figure 4:
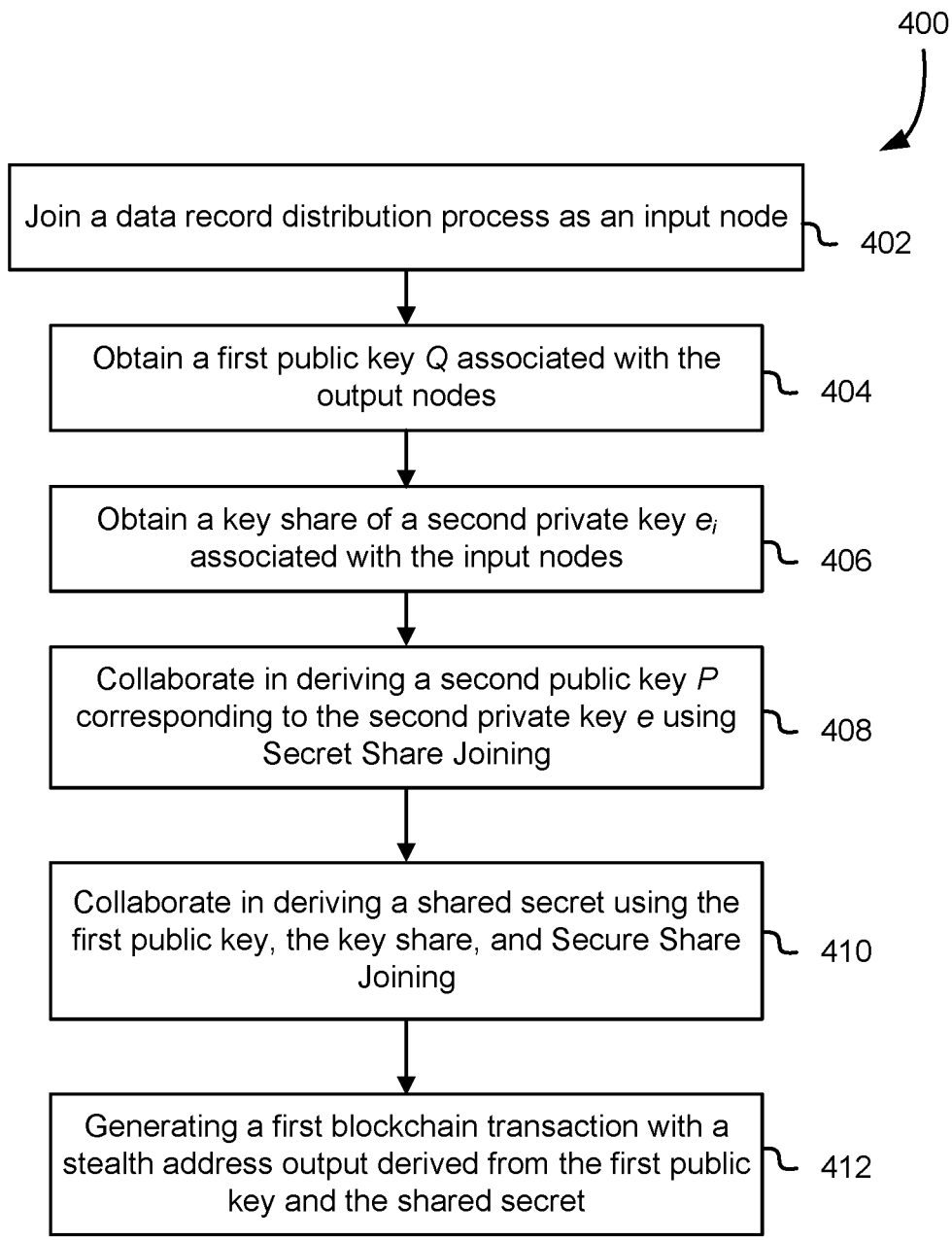
FIG. 4 shows, in flowchart form, an example process for participating as an input node in a data record distribution operation in accordance with an embodiment of the present application.

Reference will now be made to FIG. 4, which shows, in flowchart form, an example process 400 for participating as an input node in a data record distribution operation in accordance with an embodiment of the present application. The input node in this example is a participating node in the Group A set of nodes that contribute input data records to the distribution operation. The process 400 begins with the input node joining the data record distribution process in operation 402. The joining process has not been detailed herein and may be implemented in a decentralized manner or through a central authority that assembles suitable groups of input nodes and output nodes based, perhaps, on ensuring equal input values and/or output values (in the case of currency mixing), common data records types, and/or sufficient numbers in each group.

In operation 404, the input node receives a first public key Q associated with the Group B output nodes. In operation 406, the input node receives a key share $e_i$ of a second private key e associated with the Group A input nodes. Operations 404 and 406 may occur in a different order or simultaneously in some implementations. It will be appreciated that the second private key e has a corresponding public key P. In operation 408, the input node collaborates with other input nodes in Group A to derive the second public key P using secret share joining. This collaboration involves at least $m_A$ of the $n_A$ nodes in Group A. Note that the complete second private key e is not known to any node in the Group A input nodes since each node only has its respective share $e_i$ of the key.

In at least one implementation, the second public key P may be calculated by a single node, rather than relying on secret share joining and key shares $\{e_i\}$, since there will be no value stored at P in the transactions; however, this means that the single node would have the private key e. This may be of concern if the second public key P is used as a location, or to derive a location, for storing data records or value in some instances, such as refunds or change or the like. Accordingly, it is preferable to employ secret share joining and key shares in the determination of the second public key P.

As noted above, the determination of a stealth address at which to store data records is based on a shared secret c that can be determined by both the Group A and Group B nodes, working collaboratively within their groups. In this example, the shared secret is given by $c=H(e \times Q)=H(d \times P)$, to allow both groups to determine it independently.

In operation 410, the input node collaborates in determining the shared secret c using Secret Share Joining. As noted above, this involves the input node calculating its term in the Lagrange Polynomial Interpolation, i.e. $b_{i,\pi}e_i \times Q$. The terms are summed and hashed to find the shared secret c. In some implementations, one of the participating Group A nodes may act as a 'master' node for accumulating the terms, summing them, and hashing the sum to find the shared secret c. In some other implementations, two or more, or all, of the Group A nodes may make the same calculation to find the shared secret c. It will be appreciated that the nodes of Group B are not yet aware of the shared secret c since they do not have the Group A public key P. Group A does not share its public key P other than through the transaction, as will be described below.

In operation 412, the input node participates in joining or generating a first transaction by contributing its input data record (for example, as specified by the UTXO at which a value is stored). The first transaction pools all the input data records at a stealth address, $A_{pool}$, that is derived from the shared secret c and the public key Q of the Group B output nodes. In a particular example, $A_{pool}=Q+(c \times G)$, although other expressions may be used to derive the stealth address from the second public key Q and the shared secret c. In this expression, the term $(c \times G)$ is the secret public key having the shared secret c as its private key.

The first transaction includes the second public key. In some implementations, the second public key is inserted in a non-transactional data field so it does not affect the transaction but is publicly readable in the confirmed transaction once it is on the blockchain. In some implementations, the non-transaction data field is signalled using a non-transactional code, like OP_RETURN in the Bitcoin protocol.

The first transaction is then submitted for validation and confirmation by the blockchain network, where it is eventually incorporated into a block on the blockchain.

Figure 5:
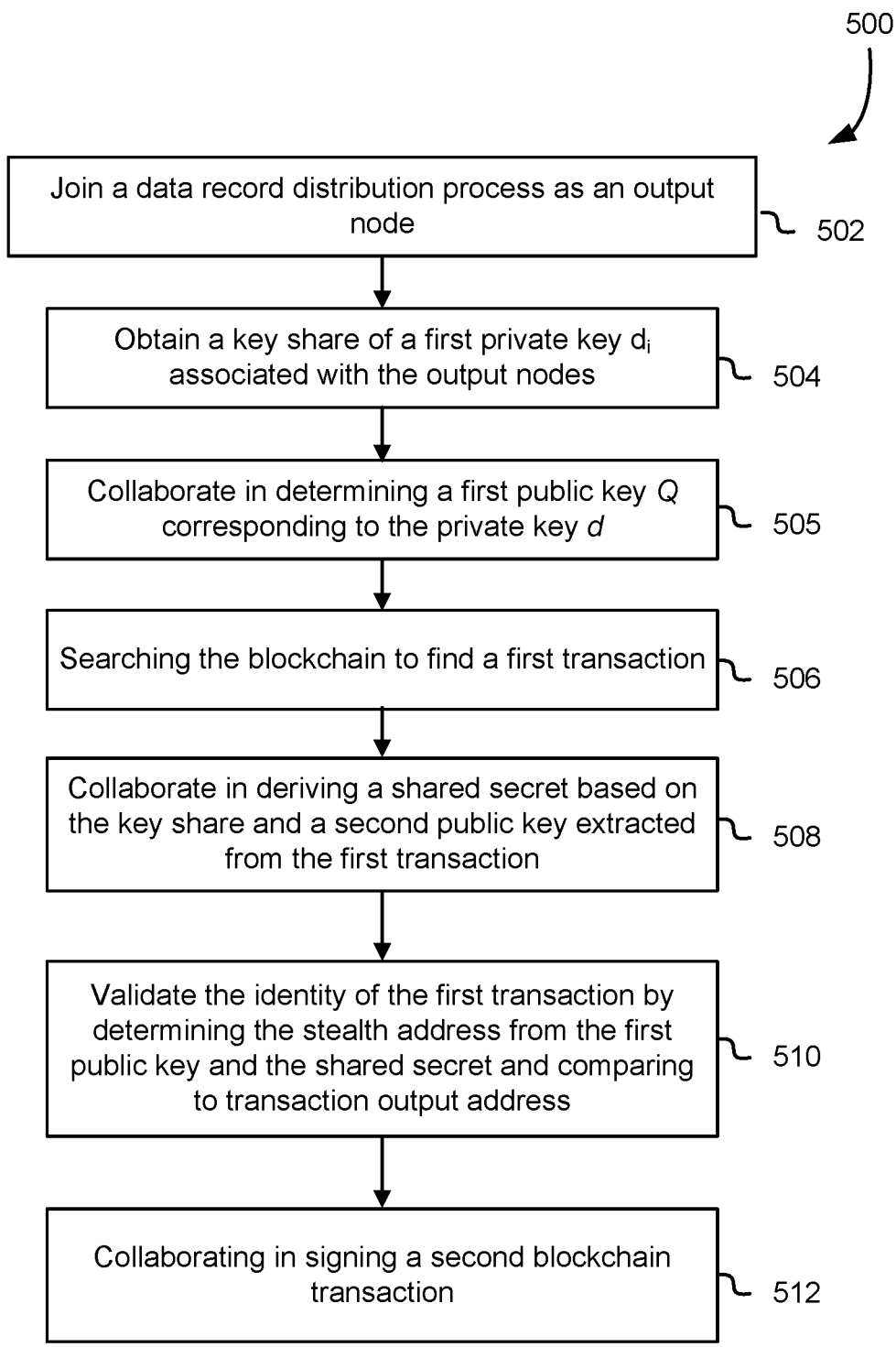
FIG. 5 shows, in flowchart form, an example process for participating as an input node in a data record distribution operation in accordance with an embodiment of the present application.

Reference will now be made to FIG. 5, which shows, in flowchart form, an example process 500 for participating as an output node in a data record distribution process in accordance with an embodiment of the present application. The process 500 includes the output node first joining the data record distribution process, as indicated by operation

502. As noted previously, the joining may involve a decentralized join process or a more centralized managed process of assembling suitable groups, depending on the specific implementation.

In operation 504, the output node obtains a key share of a first private key $d_i$ associated with the output nodes. The complete private key d is unknown to any of the output nodes. The private key d has a corresponding public key Q, which is also unknown to the output nodes initially. However, the output node joins in collaboratively determining the first public key Q using its key share $d_i$ of the first private key and Secret Share Joining, as indicated by operation 505. Thus the public key Q is then known to the output node and the other nodes of the Group B set of output nodes. The public key Q is disseminated or made available such that it becomes available to the Group A set of input nodes, since they will use the first public key Q in their generation of the shared secret c.

In operation 506, the output node searches the blockchain to identify a first transaction. The searching may be based on identifying transactions that contain a particular signal or code signifying the presence of non-transactional data, which could potentially be the second public key P. In one implementation, the signal detected is a non-transactional code, such as OP_RETURN in the Bitcoin protocol, which indicates that the data following the code is non-transactional.

It will be appreciated that the searching of operation 506 may be carried out by one, some or all of the output nodes in Group B. In some implementations, it may be carried out by a central server or node not part of Group B in the case of a centrally-organized data record distribution process; that is, the organizer node may carry out the searching on behalf of the Group B nodes and may provide them with qualifying transactions as they are found for subsequent testing by the Group B nodes, as described below.

In operation 508, the output node participates in attempting to collaboratively derive the shared secret c using the second public key P found in the first transaction and Secret Share Joining. As noted above, the shared secret in this example is expressed as $c=H(e\times Q)=H(d\times P)$. The output nodes of Group B assume that the data extracted from the identified transaction is the second public key P and on this basis collaboratively calculate what they presume is c from $H(d\times P)$. This involves the output node calculating its respective term in the Lagrange Polynomial Interpolation, i.e. $b_{i,\pi}d_i \times P$. The terms are summed and hashed to find what they presume is the shared secret c, which it will be if the extracted data is actually the second public key P. One of the nodes may act as a 'master' node for the purpose of summing the terms and hashing them to find the shared secret c. In some implementations, each of the nodes may make the same calculation so that all nodes in Group A calculate the shared secret c.

Assuming that they have correctly calculated the shared secret from the identified transaction, the output nodes then test that shared secret by seeing if they can use it to determine a stealth address that matches the output address specified in identified transaction. In operation 510, the output node participates in validating the stealth address $A_{pool}$ using the Group B first public key Q and the calculated shared secret c. Recall that the stealth address is given by $Q+(c\times G)$. Again, one of the Group B nodes may perform this validation test in some implementations. In some other implementations, two or more, or all, of the Group B nodes may perform the same validation test to verify that they have identified the correct transaction. If the calculated $A_{pool}$ matches the output address in the transaction, then the output nodes have verified that they have the correct transaction and properly extracted the second public key P. Moreover, they (collectively) are now able to generate the private key (d+c) corresponding to $A_{pool}$ that will enable them to distribute data records from $A_{pool}$.

In operation 512, the output node collaboratively participates with at least $2t_B$ other output nodes in signing a second blockchain transaction that distributes data records from $A_{pool}$ to the respective output addresses. To sign the second blockchain transaction, the output nodes must generate a signature based on private key d+c. None of the output nodes has the full first private key d, so they collaborate in a Threshold Signature Scheme to generate the correct signature. In some implementations, like with the Bitcoin protocol, this involves an elliptic curve digital signature algorithm using the shared secret c and key share d, and reliant upon using Secure Inverse and Secure Multiplication. In particular, in this example, the output node collaborates by determining its respective term of the Lagrange Polynomial Interpolation. In this example, the term calculated by the output node may be expressed as $(b_{i,\pi}k_i^{-1}(m+d_i+cr))\mod n$, where k is a random number less than the subgroup order, m is the message being signed (typically, a truncated hash of the transaction), n is a large prime number, b is the Langrage coefficient in the Lagrange polynomial interpretation, $d_i$ is the key share of the first private key, c is the shared secret, and r is $k\times G$.

Once the transaction has been signed, it is submitted for validation and confirmation, and is eventually included in a block on the blockchain.

It will be appreciated that some of the described operations in the above example embodiment may occur contemporaneously or in a different order in some implementations without materially impacting the processes. The present application encompasses those variations and modifications.

Figure 6:
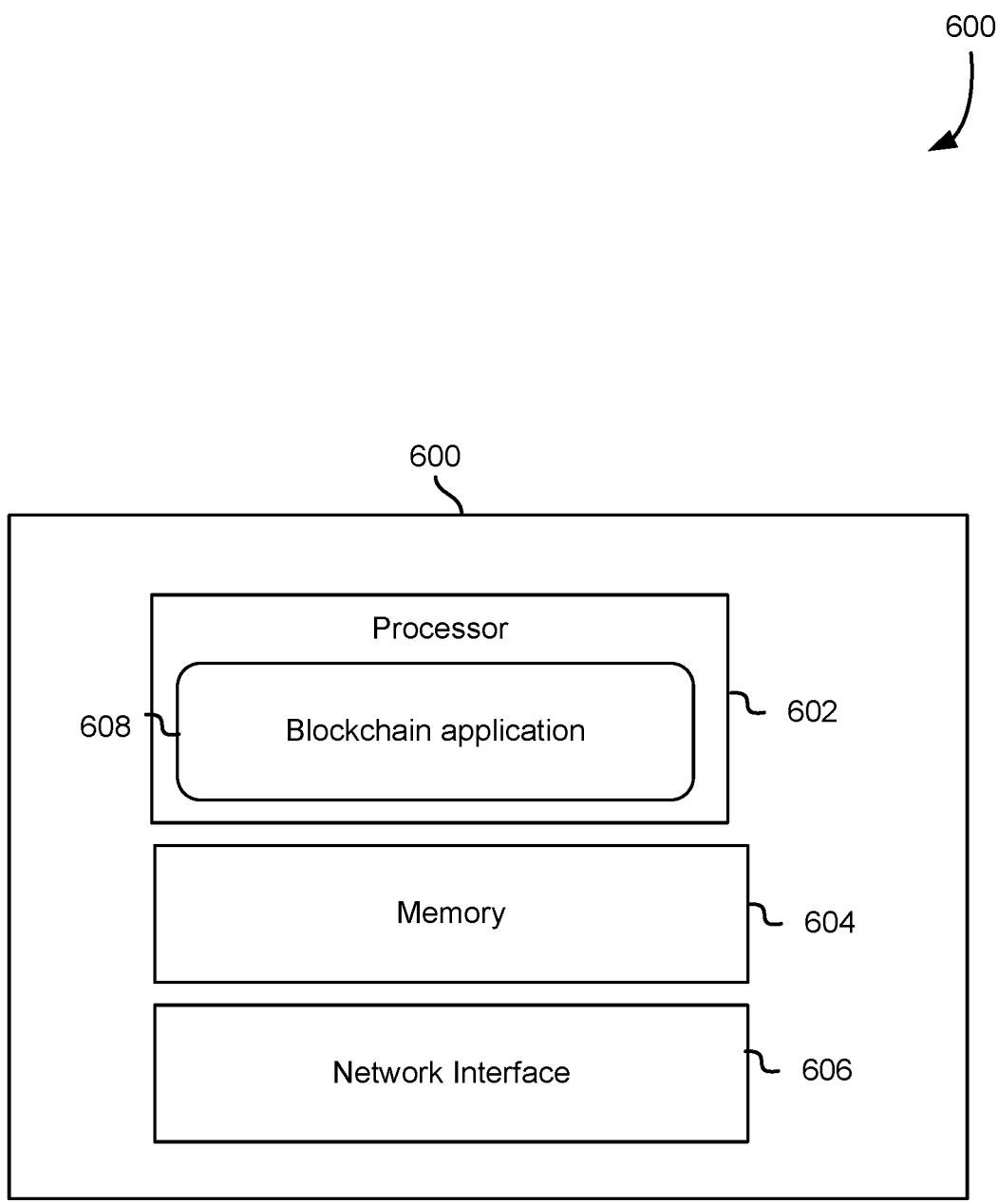
FIG. 6 shows a block diagram of a simplified participating node.

Reference will now be made to FIG. 6, which shows, in block diagram form, a simplified example of a participating node 600. The node 600 may be an input node or an output node. The node 600 includes a processor 602, which may include one or more microprocessors, application specific integrated chips (ASICs), microcontrollers, or similar computer processing devices. The node 600 further includes memory 604, which may include persistent and non-persistent memory, to store values, variables, and in some instances processor-executable program instructions, and a network interface 606 to provide network connectivity over wired or wireless networks.

The node 600 includes a processor-executable blockchain application 608 containing processor-executable instructions that, when executed, cause the processor 602 to carry out one or more of the functions or operations described herein.

It will be understood that the devices and processes described herein and any module, routine, process, thread, application, or other software component implementing the described method/process for configuring the video feature extractor may be realized using standard computer programming techniques and languages. The present application is not limited to particular processors, computer languages, computer programming conventions, data structures, other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method to participate in a data record distribution process using a blockchain, the data record distribution process including multiple input addresses and multiple output addresses, each address being controlled by a respective input node or output node, the computer-implemented method, implemented at one of a plurality of input nodes, comprising:
    obtaining a first public key associated with the output nodes;
    obtaining a key share of a second private key associated with the input nodes, wherein the second private key is unknown to any of the input nodes and wherein each of the input nodes has a respective key share of the second private key;
    obtaining a threshold number of first terms by calculating a first term and receiving further first terms from other input nodes, each first term being a term of a first Lagrange polynomial interpolation that includes a key share of the respective node;
    deriving a second public key corresponding to the second private key by summing said first terms;
    obtaining a threshold number of second terms by calculating a second term and receiving further second terms from the other input nodes, each second term being a term of a second Lagrange polynomial interpolation that includes the key share of the respective node and the first public key;
    deriving a third private key by summing said second terms; and
    generating a first blockchain transaction that receives data records from the multiple input addresses and that has a stealth address as an output address, wherein the stealth address is based on the first public key and the third private key.

2. The computer-implemented method claimed in claim 1, wherein the first blockchain transaction includes a non-transactional code and a copy of the second public key.

3. The computer-implemented method claimed in claim 2, wherein the non-transactional code is OP_RETURN or a functional equivalent, and wherein the copy of the second public key follows the OP_RETURN in the first blockchain transaction.

4. The computer-implemented method claimed in claim 1, wherein generating the first blockchain transaction includes determining the stealth address as a sum of the first public key and a secret public key having a shared secret as a corresponding private key.

5. A computer-implemented method to participate in a data record distribution process using a blockchain, the data record distribution process including multiple input addresses and multiple output addresses, each address being controlled by a respective input node or output node, the computer-implemented method, implemented at one of a plurality of output nodes, comprising:
    obtaining a key share of a first private key associated with the output nodes, the first private key being unknown to any of the output nodes, the first private key being associated with a first public key, wherein each of the output nodes has a respective key share of the first private key;
    searching the blockchain for a first blockchain transaction containing a second public key associated with the input nodes, the first blockchain transaction identifying the multiple input addresses and having a stealth address as an output address;
    obtaining a threshold number of first terms by calculating a first term and receiving further first terms from other output nodes, each first term being a term of a first Lagrange polynomial interpolation that includes a key share of the respective node and the second public key;
    deriving a shared secret by summing said first terms;
    determining the stealth address using the first public key and the shared secret and comparing the determined stealth address to the output address of the first blockchain transaction to confirm they match;
    obtaining a threshold number of second terms by calculating a second term and receiving further second terms from other output nodes, each second term being a term of a second Lagrange polynomial interpolation that is derived from the key share of the respective node and the shared secret;
    deriving a second private key using the sum of the second terms; and
    signing, using an elliptic curve digital signature algorithm based on the second private key, a second blockchain transaction to distribute data records pooled in association with the stealth address to the multiple output addresses.

6. The computer-implemented method claimed in claim 5, wherein searching the blockchain comprises identifying transactions containing a non-transactional code.

7. The computer-implemented method claimed in claim 6, wherein the non-transactional code comprises OP_RETURN in the first blockchain transaction, and wherein the second public key follows the OP_RETURN in the first blockchain transaction.

8. The computer-implemented method claimed in claim 5, further comprising:
    obtaining a threshold number of third terms by calculating a third term and receiving further third terms from other output nodes, each third term being a term of a third Lagrange polynomial interpolation that includes the key share of the respective node; and
    deriving the first public key corresponding to the first private key.

9. The computer-implemented method claimed in claim 5, wherein determining the stealth address includes determining the stealth address as a sum of the first public key and a secret public key having the shared secret as a corresponding private key.

10. The computer-implemented method claimed in claim 5, wherein calculating the second term includes:
    obtaining a share of a value, wherein each of the output nodes has a respective share of the value;
    obtaining a threshold number of fourth terms by calculating a fourth term and receiving further fourth terms from other output nodes, each fourth term being a term of a fourth Lagrange polynomial interpolation that includes a value derived from a share of the respective node; and calculating a reciprocal value using said fourth terms, wherein each of the output nodes calculates a respective reciprocal value;

wherein said term of the second Lagrange polynomial interpolation includes a reciprocal value of the respective node, a key share of the respective node, and the shared secret.

11. A computing device to participate in a data record distribution process using a blockchain among a plurality of participating nodes, the computing device being one of the plurality of participating nodes, the computing device comprising:
a processor;
memory;
a network interface to provide network connectivity; and
a blockchain application containing computer-executable instructions that, when executed by the processor, cause the processor to carry out the computer-implemented method claimed in claim 1.

12. A non-transitory processor-readable medium storing processor-executable instructions to participate in a data record distribution process using a blockchain among a plurality of participating nodes, wherein the processor-executable instructions, when executed by a processor in one of the plurality of participating nodes, cause the processor to carry out the computer-implemented method claimed in claim 1.

13. A computing device to participate in a data record distribution process using a blockchain among a plurality of participating nodes, the computing device being one of the plurality of participating nodes, the computing device comprising:
a processor;
memory;
a network interface to provide network connectivity; and
a blockchain application containing computer-executable instructions that, when executed by the processor, cause the processor to carry out the computer-implemented method claimed in claim 7.

14. A non-transitory processor-readable medium storing processor-executable instructions to participate in a data record distribution process using a blockchain among a plurality of participating nodes, wherein the processor-executable instructions, when executed by a processor in one of the plurality of participating nodes, cause the processor to carry out the computer-implemented method claimed in claim 5.

* * * * *